United States Patent [19]

Scheuerpflug

[11] 3,751,061
[45] Aug. 7, 1973

[54] VEHICLE WITH INDIVIDUAL WHEEL SUSPENSION

[75] Inventor: Hans Scheuerpflug, Bad Mingolsheim, Germany

[73] Assignee: Johannes Fuchs, K. G., Ditzingen, Germany

[22] Filed: Jan. 12, 1972

[21] Appl. No.: 217,138

[30] Foreign Application Priority Data
Jan. 14, 1971 Germany............... P 21 01 513.4

[52] U.S. Cl............................................. 280/96.2 R
[51] Int. Cl............................................. B60p 1/00
[58] Field of Search ............... 280/96.2 R, 96.2 B, 280/96.1, 6

[56] References Cited
UNITED STATES PATENTS
2,736,570  2/1956  Crane............................. 280/96.2 R Primary Examiner—Edward A. Sroka
Attorney—Nichol M. Sandoe et al.

[57] ABSTRACT

An individual wheel suspension for a vehicle comprising a single transverse lever for pivotably connecting a wheel to the vehicle chassis, and hydraulic means for adjusting the camber of the wheel within wide limits independently of any angular position to which the transverse lever might be pivoted.

6 Claims, 4 Drawing Figures

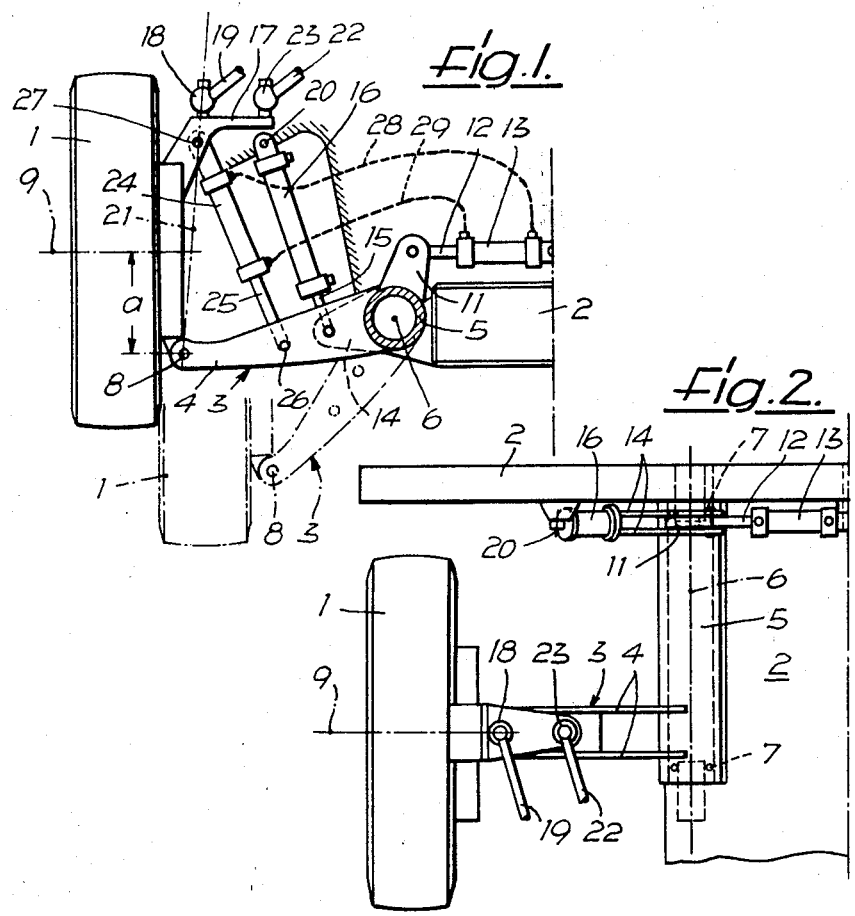

VEHICLE WITH INDIVIDUAL WHEEL SUSPENSION

The present invention relates to a vehicle, especially a crane truck, which is provided with an individual suspension of its wheels which comprises a single transverse lever for connecting each wheel to the chassis of the vehicle which lever is directly connected to the chassis by an articulated joint and is indirectly connected to a wheel-gauge-holding device and to the wheel by another articulated joint.

It is already known to provide a crane truck with an individual wheel suspension which comprises two transverse levers above each other for connecting the respective wheel to the chassis of the vehicle. The upper of these two levers may be controlled by a hydraulic cylinder unit which serves as a device for maintaining and adjusting the wheel gauge. Such a crane truck with individually suspended wheels which are hydraulically adjustable independently of each other has found great acclaim because of its maneuvering capability. However, the individual wheel suspensions of such a vehicle each of which comprises two transverse levers has the disadvantage that the bearing means of the upper transverse lever on the chassis frame or on an extension thereof require considerable space in the vertical direction as well as between the inner side of the wheel and the frame. The space remaining above the frame between each pair of opposite wheels is then restricted to such an extent that it is difficult to mount larger elements, for example, combustion engines of a greater width, within this space on the frame. Furthermore, this individual wheel suspension does not permit the camber of each wheel to be adjusted at any particular angular position of the two levers in accordance with different operating conditions of the crane truck.

There are other vehicles known of the type as first mentioned above in which each individual wheel suspension comprises only a single transverse lever. The wheels of these vehicles are either rigidly connected to the transverse levers or, if they are to be used as steering wheels, they are connected to these levers so as to be pivotable about vertical axes. If in either case the position of a wheel is changed, for example, when the wheel gauge is adjsuted or when the transverse lever is pivoted due to the resilient suspension of the wheel, such a change will also cause a change of the camber of the wheel since it always depends upon the position of the transverse lever. Such an individual wheel suspension with only a single transverse lever has, however, the advantage over a suspensions with two transverse levers that it takes up less space.

It is an object of the present invention to provide a vehicle with an individual wheel suspension which only requires a single transverse lever for connecting the wheel to the chassis and which permits the camber of the wheel to be arbitrarily adjusted within wide limits regardless of the angular position in which the transverse lever might be located.

For attaining this object in a vehicle of the type as first mentioned above, the invention provides that the pivot axes of the joints of the transverse lever on the respective wheel and on the chassis extend parallel to each other, that the wheel is connected at substantially diametrically opposite points above and below the axis of rotation of the wheel by knucle or ball-and-socket joints to the transverse lever and to one end of a longitudinal lever, the other end of which is likewise connected by a knuckle or ball-and-socket joint to the chassis, and that for adjusting and maintaining the camber of the wheel a hydraulic cylinder unit is provided the opposite parts of which are connected at points spaced from the wheel joint of the transverse lever to the wheel and to the transverse lever, respectively. Since contrary to the known designs of individual wheel suspensions with only one transverse lever the joint of which on a steerable wheel has a vertical pivot axis, the invention provides that the joint of the transverse lever on the wheel has a pivot axis which extends parallel to the pivot axis of this lever on the chassis, it is now possible to adjust the wheel to any desired camber at any angle to which the transverse lever may be pivoted. Since the wheel is connected at one of two substantially diametrically opposite points above and below the axis of rotation of the wheel to the transverse lever and at the other point by means of a knuckle or ball-and-socket joint to one end of a longitudinal lever the other end of which is connected to the chassis, the invention attains the advantageous result that the transverse lever and its joints will not be affected by torsion which might be caused by driving and braking forces. The connecting points between the wheel and the transverse lever and the longitudinal lever are preferably spaced at equal distances from the axis of the wheel. Since for adjusting and maintaining the camber of the wheel the invention provides a hydraulic cylinder unit, this unit may be operated and controlled so as to adjust the plane of the wheel to any desired angle relative to the transverse lever and to maintain the wheel at the desired angle. The present invention therefore permits the wheel to be adjusted to any desired camber regardless of the angle to which the transverse lever is pivoted. By providing suitable control means for the hydraulic camber-adjusting unit, it is therefore also possible to maintain the camber of the wheel always at the same angle even if the gauge-holding device is provided in the form of spring means which permit the gauge of the wheel to vary from a central value due to the resilient movements of the transverse lever. It is further possible according to the invention to control the camber of the wheel so that during the pivoting movements of the transverse lever which are due to these spring means, the camber will always remain the same. This is especially of importance in winter when the vehicle is driven on an ice-covered road. On vehicles which should be mounted solidly on a soft ground, and especially in mobile cranes, crane trucks or the like, the invention may be employed with considerable advantage by pivoting the wheels of the vehicle by means of the hydraulic camber adjusting unit to a horizontal position so that their outer lateral surfaces rest flat on the soft ground and thus form a firm suport of the chassis.

The invention may also be applied with considerable advantage on vehicles the wheel gauge of which should be adjustable, for example, on crane trucks which, when the crane is to be operated should have a wheel gauge larger than that which traffic regulations permit verhicles to have during their travel on public roads. According to the invention, this may be easily attained by providing a gauge holding and gauge adjusting device, for example, in the form of a hydraulic gauge adjusting cylinder unit which permits the transverse lever to be pivoted to any desired angular position. For travel of the vehicle, the transverse levers may then be pivoted downwardly so that the wheels will be located closely adjacent to the chassis, while for the operation of the crane the transverse levers may be pivoted upwardly so as to increase the wheel gauge.

While the camber of each wheel may be adjusted by a manual control of the hydraulic camber adjusting unit, a preferred embodiment of the invention provides for this purpose a hydraulic control cylinder unit which is mounted between two points which are spaced from each other at a distance which depends upon the position of the wheel relative to the chassis. By the use of such a hydraulic control unit it is possible to control the operation of the hydraulic camber-adjusting unit in accordance with a predetermined program in response to the position of the wheel relative to the chassis. In a very simple embodiment of the invention, both hydraulic cylinder units are double-acting and each cylinder chamber of one hydraulic unit is connected with one cylinder chamber of the other hydraulic unit so that any adjustment of the hydraulic control unit will immediately result in a corresponding adjustment of the hydraulic camber-adjusting unit.

Another advantageous feature of the invention consists in connecting the wheel to the transverse lever and to the hydraulic camber-adjusting unit and the latter to the transverse lever by means of knuckle or ball-and-socket joints, and in mounting those joints at the wheel side of the transverse lever, of the hydraulic camber-adjusting unit and of the longitudinal lever so as to be disposed within a straight line which forms the steering axis of the wheel. These joints of the camber-adjusting unit and of the longitudinal lever are provided on a steering arm which is secuted to the wheel and which at a certain distance from the steering axis is connected by another knuckle or ball-and-socket joint to one end of a second longitudinal lever, the other end of which is connected by a similar joint to the chassis if the respective wheel is not to be steerable. If the wheel is to be steerable, this other end of the second longitudinal lever is to be connected to the steering lever of a steering gear. The individual wheel suspension according to the invention may in this manner be employed without structural changes either for a steerable wheel or for a nonsteerable wheel. These two longitudinal levers should preferably be of substantially the same length and extend substantially parallel to each other, and both of them should preferably be pivotably connected to the mentioned steering arm which is secured to and projects from the wheel. By this double-lever arrangement the result may be attained that if any change of the position of the wheel occurs, both longitudinal levers will carry out the same movement so that the position of the wheel relative to its steering axis will always remain the same regardless of any adjustments of the camber and gauge of the wheel. This feature of the individual wheel suspension according to the invention renders it superior to any of the individual wheel suspensions as were previously known.

If for pivoting the transverse lever a hydraulic wheel-gauge adjusting unit is employed, the cylinder chamber of this unit may be connected in a conventional manner with a resilient chamber for the hydraulic fluid so that a resilient suspension of the vehicle will thus also be attained. If, however, a highly resilient suspension is not desired, the gauge-holding device may be provided in the form of a rigid, but preferably adjustable, connection of the transverse lever with the chassis. In this case it may be advisable to connect the hydraulic camber-adjusting cylinder unit with a resilient chamber for the hydraulic fluid so that a resilient variation of the wheel camber and thus a slight resilience of the wheel mounting will be attained.

The features and advantages of the present invention will become further apparent from the following detailed description thereof which is to be read with reference to the accompanying diagrammatically simplified drawings of several embodiments of the invention, in which FIG. 1 shows a rear view of an individual wheel suspension according to a first embodiment of the invention;

FIG. 2 shows a top view of the individual wheel suspension according to FIG. 1;

FIG. 3 shows a rear view of an individual wheel suspension according to a second embodiment of the invention; while FIG. 4 shows a rear view of an individual wheel suspension according to a third embodiment of the invention.

In the drawings, FIGS. 1 and 2 illustrate diagrammatically an individual wheel suspension according to the invention, in which a wheel 1 is connected to the chassis 2 of a vehicle by means of a single transverse lever 3 which consists of a pair of parallel arms 4 the inner ends of which are welded upon one end part of a tubular member 5 which is mounted on bearings 7 within the chassis 2 so as to be rotatable about its longitudinal axis 6 which extends parallel to the direction of travel of the vehicle. On their outer ends, arms 4 are provided with one or a pair of knuckle joints 8 which connect these arms 4 and thus the transverse lever 3 to the wheel 1 at a distacne a from and below the axis of rotation 9 of the wheel; the wheel connection at joint or joints 8 will be understood to be sufficiently universal to permit steering orientation of wheel 1, about a steering axis 21.

Near its other end the tubular member 5 is provided with radial arms 11 and 14 which project in two different directions. Arm 11 is pivotably connected to the piston rod 12 of a hydraulic control unit 13 the cylinder of which is pivotably mounted on chassis 2, while the other arm 14 is pivotably connected to the piston rod 15 of a hydraulic cylinder unit 16 which serves for maintaining the wheel gauge. The cylinder of this unit 16 is pivotably mounted on chassis 2 so as to be pivotable about an axis 20.

Diametrically opposite to the knuckle joint 8 of the transverse lever 4 on wheel 1 and thus above the axis 9 of the wheel and at a distance from this axis which is substantially equal to the distance $a$, a steering arm 17 is rigidly connected to wheel 1. This steering arm 17 is connected by a ball-and-socket joint 18 to one end of a longitudinal lever 19 which extends along the chassis 2 and the other end of which (not shown) is likewise connected by a ball-and-socket joint to the chassis 2. The driving and braking forces acting upon the axis 9 of wheel 1 will thus be taken up by the transverse lever 3 and the longitudinal lever 19 without producing any torque.

Due to this connection of wheel 1 to the transverse lever 3 by emans of the knuckle joint 8 and to the longitudinal lever 19 by means of the ball-and-socket joint 18, wheel 1 is pivotable about an axis 21 which connects the joints 8 and 18 by a straight line and forms the steering axis of the wheel. For maintaining the wheel in a fixed position about the steering axis 21 if this wheel is not to be steerable, or for varying the steering angle of the wheel by a steering gear, a second longitudinal arm 22 is provided which is likewise connected by a ball-and-socket joint 23 to the steering arm 17, but at a larger distance from wheel 1 than the joint 18. This longitudinal lever 22 has substantially the same length as the longitudinal lever 19 and it extends parallel to the latter. If wheel 1 should not be steerable, the end of lever 22 opposite to the end carrying the ball-and-socket joint 23 is connected by another ball-and-socket joint, not shown, to the chassis 2, and if wheel 1 is to be steerable, this end of lever 22 is connected to a steering lever of the steering gear. Since the two longitudinal levers 19 and 22 have the same length and extend parallel to each other, a varation of the wheel position which may be caused by pivoting the transverse lever 3 about its axis 6 on chassis 2 or by pivoting the wheel about the joint 8, if lever 3 is held in a fixed position, will not change the steering angle of wheel 1.

For maintaining and adjusting the chamber of wheel 1, a hydraulic cylinder unit 24 is provided the piston rod 25 of which is connected by a knuckle joint 26 to the transverse lever 3, while its cylinder is likewise connected by a knuckle joint 27 to the steering arm 17. This knuckle joint 27 is designed for univeral action and so that the point of intersection of its two axes of rotation is disposed accurately within the steering axis 21 so that the steering movement of wheel 1 will not be affected at all by the hydraulic camber adjusting unit 24.

This chamber-adjusting unit 24 as well as the hydraulic control unit 13 are double-acting cylinder and piston units the cylinder chambers of which have substantially the same volume. Each of the cylinder chambers of the camber-adjusting unit 24 is connecged by a conduit 28 or 29 with the corresponding cylinder chamber of the control unit 13 so that a movement of the piston of unit 13 which is caused by a pivoting movement of the transverse lever 3 will immediately produce a corresponding movement of the piston of unit 24 and will thus insure that the camber of the wheel will remain the same regardless of the angle to which the transverse lever 3 is pivoted, as indicated in dot-and-dash lines in FIG. 1.

The wheel suspension as shown in FIGS. 1 and 2 may be modified in a manner not particularly illustrated by connecting the hydraulic camber-adjusting unit 24 and for the hydraulic control unit 13 in a manner known as such, for example, to a resilient chamber for the hydraulic fluid. Thus, a resilient suspension of wheel 1 may be attained by a resilience of the wheel camber and/or of the wheel gauge relative to the positions to which they are adjusted.

It is also possible to measure the pressures in the different hydraulic units in a conventional manner so as to permit the wheel loads to be controlled by any suitable overload protection devices.

Although in the particular wheel suspension as illustrated in FIGS. 1 and 2 the hydraulic gauge adjusting unit 16 acts upon the arm 14 of the tubular member 5, it may also act directly upon the transverse lever 3 or, if the wheel 1 is not to be steerable, directly upon the wheel, for example, at the center thereof.

The mode of operation of the wheel suspension as illustrated in FIGS. 1 and 2 is evident from the foregoing description. The transverse lever 3 may be pivoted by the hydraulic gauge adjusting unit 16 to any desired position so as to vary the height of the chassis 2 from the ground as well as the wheel gauge. During this pivoting movement of the transverse leve 3 the hydraulic control unit 13 readjusts the camber-adjusting unit 24 accordingly so that the camber of wheel 1 will always remain the same, as indicated in FIG. 1 by two positions of the wheel as shown in solid and dot-and-dash lines. This movement causes the two longitudinal levers 19 and 22 to be pivoted only about their ends opposite those which are connected to the steering arm 17 so that the steering angle of wheel 1 will not be changed. The camber-adjusting cylinder unit 24 may, however, also be connected to a hydraulic control unit, not shown, which is adjusted to interrupt the connection to the control unit 13 and permits the wheel to be adjusted to any desired cmaber without affecting the position of the transverse lever 3 so that, if the cylinder unit 24 is made of suitable dimensions, wheel 1 may be pivoted, for example, to a horizontal position and be used as a firm support of the chassis 2.

FIG. 3 illustrates a modification of the wheel suspension according to the invention as previously described. Those parts of this wheel suspension which functionally correspond to the parts as shown in FIGS. 1 and 2 and therefore do not need to be described again in detail are designated in FIG. 3 by reference numerals which are increased by 100 over the numerals as applied in FIGS. 1 and 2.

The individual wheel suspension as shown in FIG. 3 comprises a single transverse lever 103 which is provided with a gauge holding device in the form of a spring 116 which similarly to the hydraulic gauge holding unit 16 according to FIGS. 1 and 2 is connected between the chassis 102 and the transverse lever 103. The steering angle of wheel 101 is maintained by two longitudinal levers 119 and 122 similarly as in FIGS. 1 and 2. For adjusting and maintaining the camber of the wheel, this wheel suspension is provided with a hydraulic camber-adjusting unit 124 and a hydraulic control unit which is connected to the former by two conduits 128 and 129.

The mode of operation of the individual wheel suspension according to FIG. 3 is substantially the same as that described with reference to the wheel suspension as shown in FIGS. 1 and 2, except that it does not permit the wheel to be adjusted to different gauges but the wheel gauge only changes resiliently due to the spring 116.

In the further embodiment of the invention as illustrated in FIG. 4, those parts which functionally correspond to the parts as shown in FIGS. 1 and 2 are designated by reference numerals which are increased by 200 over the numerals as applied in FIGS. 1 and 2.

The essential difference between this individual wheel suspension and the wheel suspensions according to FIGS. 1 to 3 is that the joint 208 of the transverse lever 203 on the wheel 201 is disposed above the axis of rotation 209 of the wheel, while the steering arm 217 to which the two longitudinal levers 219 and 222 are connected is located underneath the axis 209 of the wheel. Furthermore, the transverse lever 203 is connected to the steering arm 217 by the hydraulic camber-adjusting unit 224 which is connected to the hydraulic control unit 213 by the conduits 228 and 229.

The gauge-holding device also consists in this case similarly as in FIG. 3 of a spring 216.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A vehicle having a chassis and wheels and an individual wheel suspension for connecting each of said wheels to said chassis, said wheel suspension comprising a single transverse lever, articulated joints connecting one end of said transverse lever to said chassis and the other end to said wheel, said chassis and wheel joints of said transverse lever having parallel pivot axes extending substantially in the direction of travel of the vehicle, a wheel-gauge holding device, articulated joints connecting one end of said wheel-gauge holding device to said chassis and its other end at least indirectly to said transverse lever, a longitudinal lever, universal joints connecting the opposite ends of said longitudinal level to said wheel and to said chassis, the points of connection of said wheel with said transverse lever and with said longitudinal lever being disposed substantially diametrically opposite to each other above and below the axis of rotation of said wheel, a hydraulic cylinder unit for adjusting and maintaining the camber of said wheel, and means for connecting the opposite ends of said cylinder unit at points spaced from said wheel joint of said transverse lever to said wheel and to said transverse lever, respectively.

2. A vehicle as defined in claim 1, further comprising a hydraulic control cylinder unit for controlling said hydraulic camber-adjusting cylinder unit, the opposite ends of said control cylinder unit being mounted at two points spaced from each other at a distance depending upon the position of said wheel relative to said chassis.

3. A vehicle as defined in claim 2, in which both of said hydraulic cylinder units are double-acting and each of them has two cylinder chambers, and conduit means for connecting the corresponding cylinder chambers of both units with each other.

4. A vehicle as defined in claim 2, further comprising means for pivoting connecting one end of said control cylinder unit to said chassis and its other end to said transverse lever.

5. A vehicle as defined in claim 1, in which said articulated joints connecting said wheel to said transverse lever and to said hydraulic camber-adjusting cylinder unit and the latter to said transverse lever are universal joints, the wheel-side joints of said transverse lever of said camber-adjusting unit and of said longitudinal lever being disposed within a straight line forming the steering axis of said wheel, a steering arm secured to said wheel, said wheel-side joints of said camber-adjusting unit and of said longitudinal lever being connected to said steering arm, a second longitudinal lever, and a universal joint connecting one end of said second longitudinal lever to said steering arm at a certain distance from said steering axis; whereby the other end of said second longitudinal lever may be connected by another universal joint to said chassis if said wheel is not to be steerable, or it may be connected to a steering lever of a steering gear if said wheel is to be steerable.

6. A vehicle as defined in claim 5, in which said two longitudinal levers have a substantially equal length and extend substantially parallel to each other and are both connected by universal joints to said steering arm.

* * * * *